United States Patent [19]

Galloway

[11] Patent Number: 4,922,622

[45] Date of Patent: May 8, 1990

[54] MEASURING DEVICE FOR THE INTERNAL DIAMETER OF A TUBE

[75] Inventor: F. Merrill Galloway, Bellefontaine, Ohio

[73] Assignee: H.B.D. Industries, Inc., Bellefontaine, Ohio

[21] Appl. No.: 345,091

[22] Filed: Apr. 28, 1989

[51] Int. Cl.$^5$ .............................................. G01B 3/10
[52] U.S. Cl. ...................................... 33/542; 33/555.4
[58] Field of Search ...................... 33/175, 176, 178 R, 33/179, 542, 555.1, 555.4

[56] References Cited

U.S. PATENT DOCUMENTS

| | | | |
|---|---|---|---|
| 1,672,913 | 6/1928 | Schaap | 33/179 |
| 1,986,729 | 1/1935 | Johnston | 33/179 |

FOREIGN PATENT DOCUMENTS 921284 12/1954 Fed. Rep. of Germany ........ 33/179

OTHER PUBLICATIONS

Research Disclosure 19317, 5/80.

*Primary Examiner*—Harry N. Haroian
*Attorney, Agent, or Firm*—Harness, Dickey & Pierce

[57] ABSTRACT

A measuring device which has a tape connected at one end to one end of a shaft and the tape is scrolled around the shaft. The visible surface of the tape includes a scale having a set of marks which defines a system of measuring units. The tape is inserted into a tube and allowed to spring open against the inner wall of the tube. A measurement can then be obtained for the internal circumference of the tube or the internal diameter of the tube.

5 Claims, 1 Drawing Sheet

MEASURING DEVICE FOR THE INTERNAL DIAMETER OF A TUBE

TECHNICAL FIELD

The present invention generally relates to a measuring device for tubing and, more particularly, is concerned with a product and method for measuring the internal diameter of a rubber hose.

DISCUSSION

With the advent of modern statistical process control (SPC) methods of quality control, size tolerances for the internal diameter of hoses are being tightened and there is an urgent need to provide a more suitable measuring device for measuring the inside bore diameter. Up to now there has been no available means to accurately, quickly, and consistently measure the inside diameter of hoses. Only recently has the need for tighter tolerances exposed the inadequacies of the measuring devices which have been used in the past.

Although any tube could be measured by the present invention, its primary purpose is to measure the inside diameter of a rubber hose. ASTM (American Standard Testing Methods) D 380 describes the standard methods for measuring the inside diameter of rubber hoses. On hoses up to and including a nominal inside diameter of three inches the standard methods include the use of expanding ball gauges, telescoping gauges, or cylindrical-plug gauges. All three types of gauges have their inherent drawbacks in measuring the internal diameter of rubber hose.

The expanding ball gauge or split ball gauge, as it is called, is a very simple device which depends upon the operator for an accurate measurement. The end of the gauge with the ball on it is placed inside the rubber hose and the ball is then opened by twisting the opposite end of the gauge until the ball makes contact with the internal bore being measured. With a rubber hose, which is usually not perfectly round, there is no precise way of knowing what the true setting should be because the hose has some ovalness and the contact point, even when adjusted with great care, will usually indent into the rubber surface to a greater or lesser degree depending upon the force of contact and the hardness of the rubber. The ball, at its widest point, as measured by a vernier caliper is taken as the bore diameter. The split ball gauges themselves may be accurate to within 0.001 inch but the problems related to the ovalness of the hose and the indentation of the rubber at the contact point may be a source of significant error. Variations in readings between experienced operators may range above 0.394 mm (1/64th of an inch). The same problems exist with dial bore gauges which read bore diameter directly.

Inside calipers are used mostly in the measuring of larger hoses having 150 mm (about six inches) bores and larger. The common practice of averaging readings taken with measuring instruments having point contacts whether they be split ball gauges, telescoping gauges, inside calipers, etc., does not assure greater accuracy but introduces the possibility that errors may accumulate.

Cylindrical plug gauges are probably the most commonly used instrument for measuring the bore diameter of rubber hose especially in the size range of 50 mm (about two inches) and under. To measure the bore diameter the plug gauge is inserted until the hose is rounded internally and there are no visible air gaps anywhere around the hose between the plug and the internal bore. The force required to accomplish this is often sufficient to expand the hose and give a false reading. Plug gauges are commonly supplied in size increments as low as 0.025 mm (0.001 inch). Also plug gauges are made with stepped size increases in increments of as small as 0.25 mm (0.010 inch). Another common type of plug gauge is the tapered plug usually provided with graduation marks and increments of 0.025 mm (0.001 inch).

All types of plug gauges typically have the same problem as described above to the extent that variations of readings among even experienced operators leads to quality control problems. With the recent emphasis on closer tolerances a need has arisen for a method to measure the internal diameter with better accuracy.

As previously mentioned the conventional plug gauge is not very accurate because no two operators can usually agree on just how much force to use to get a perfect fit. When too much force is used the internal diameter is altered due to stretching of the rubber. When not enough force is used, air gaps remain which lead to a reading which is less than the true internal diameter. When using the plug gauge the ovalness of the rubber hose is made to conform to the round plug, which in itself requires enough force to induce error in measurement. Skill in learning just how much force to use in inserting the plug to get consistent readings is not a likely answer. In production practice there are many new employees involved and no two employees will use an identical force when measuring the internal diameter of the hose. Also, hoses vary greatly in firmness which may require different levels of force in inserting the plug gauge.

Telescoping gauges have similar problems to the other methods used to measure the internal diameter. One of these problems is due to the fact that in many cases the rubber hose is not a perfect circle, and when the telescoping gauge is inserted it is not always measuring the widest or most accurate diameter. Depending upon the firmness of the rubber when the plungers telescope out, they may indent into the inner wall of the rubber hose causing a false reading.

Consequently, a need exists to improve the accuracy of measuring the internal diameter of rubber hose. A device is needed that will not indent against the inner wall of the rubber hose; that will not leave air gaps between the inner wall of the hose and the measuring device; that will essentially eliminate errors due to the ovalness of rubber hose; and finally a device whose accuracy will not vary appreciably from operator to operator.

SUMMARY OF THE INVENTION

The present invention provides a measuring device and method designed to satisfy one or more of the aforementioned objectives. In accordance with the teachings of this invention, a measuring device is provided which comprises a shaft, with a tape connected to the shaft, and the tape scrolled around the shaft with means for indicating the internal diameter of a tube. Because this device is preferably made of a laminated paper tape which springs out against the inner wall of the rubber hose, all air gaps are filled between the tape and the inner wall. Also, ovalness of the hose is not a problem because the tape measures the entire inner wall of the hose. Indentations in the rubber are not a problem because the tape is made of a paper which is not capable of deforming the rubber. Neither should there be any variation between operators because this device is no different from any other straight line measuring tape or ruler.

This device has been found to be most useful in measuring the bore diameter of non-mandrel made long-length hose in sizes from 4.76 mm (3/16 inch) to 50 mm (2 inches). It is also useful in measuring the bore diameter of mandrel made hose, which is normally quite round, because of the ease and accuracy which measurement is made. It could easily be used for other tubes besides the rubber hose variety. The device provides a direct reading usually within 0.1 mm and by simple operator judgment the reading can be made to the nearest 0.05 mm. This is well within the requirements of the most exacting product specifications. Also, the device provides a superior tool for SPC in the manufacturing process.

DESCRIPTION OF THE PREFERRED EMBODIMENT

Figure 1:
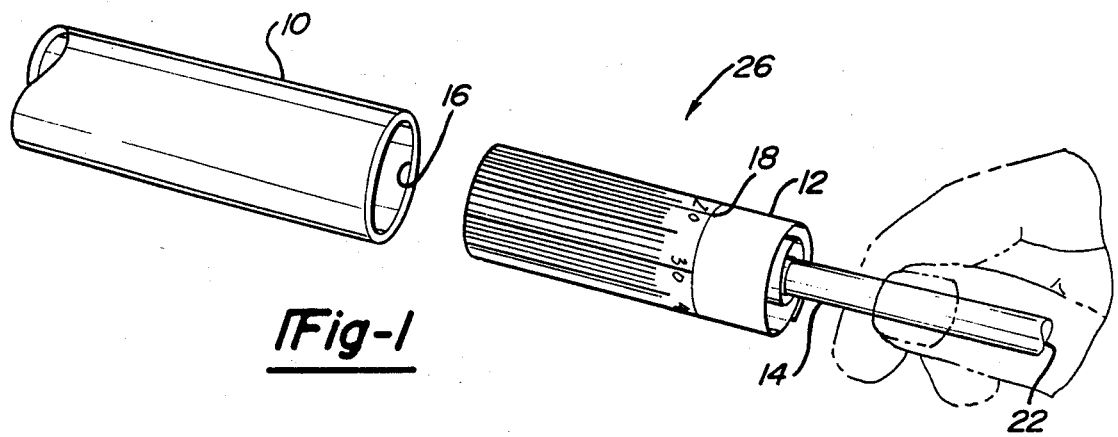
FIG. 1 is a perspective view of the rubber hose about to be measured by the measuring device of the present invention.
Figure 2:
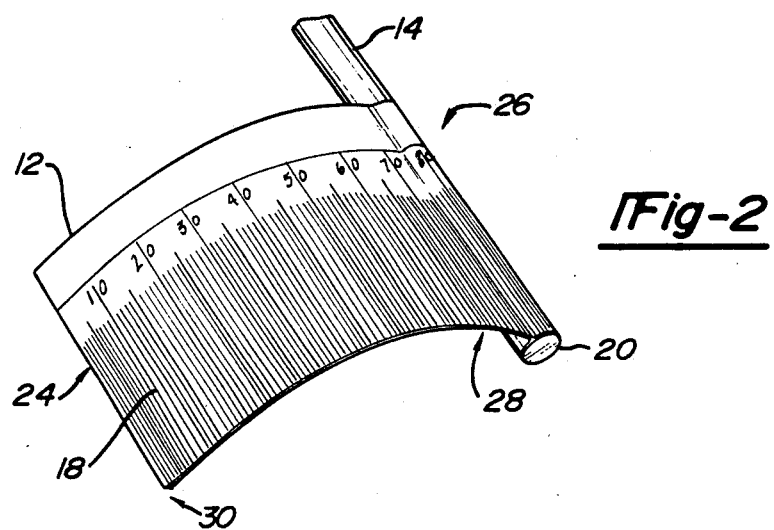
FIG. 2 is a perspective view of a measuring tape unfurled from the shaft.

Referring now to the drawings, and more particularly FIG. 1, there is shown the device, generally designated 26, for measuring the internal diameter of rubber hose 10. The device 26 basically includes a shaft 14 and a tape 12. The tape 12 is connected at a proximal end 28 as shown in FIG. 2 to the shaft 14 and the tape 12 has a distal end 30 which is capable of being scrolled around the shaft 14. The tape 12 also includes scale graduations or markings 18 for indicating the internal diameter of the tube 10 when the tape 12 is unfurled against the inner wall 16 of the tube 10.

The tape 12 is connected to one end 20 of the shaft 14. This leaves the opposite end 22 of the shaft 14 uncovered by the tape 12 so that it may be manually grasped and turned to unfurl the tape 12. The shaft 14 could be made of many different materials such as wood, plastic, or even a lightweight metal. The tape 12 should be made of a material which is capable of being scrolled around the shaft 14 and also capable of springing open against the inner wall 16 of the tube 10 being measured. The material found best so far has been a good quality grade of paper laminated after it has been printed with a scale 18. Again, the tape 12 could be made of other materials which might have a longer life as long as the material has the quality to spring open after being scrolled around a shaft 14. Connecting the tape 12 to the shaft 14 can be accomplished by numerous methods. The method used for this invention was simply gluing the tape 12 to the shaft 14. Other methods would also work and they might include stapling the tape 12 to the shaft 14 or, depending upon the material, seam welding the tape 12 to the shaft 14.

The scale 18 has a set of marks which define a system of measuring units. The scale 18 begins at the distal end 30 of the tape and should be of sufficient length to measure the internal diameter of the largest diameter tube 10 considered. The measuring units may be in any acceptable system of units whether that may be metric, English, etc. The mark or line representing the zero point on the scale 18 is the boundary end line 24 located at the distal end 30 of the tape 12. The scale 18 should also be on the outside surface of the tape 12 so that it remains visible when it is scrolled around the shaft 14.

Figure 3:
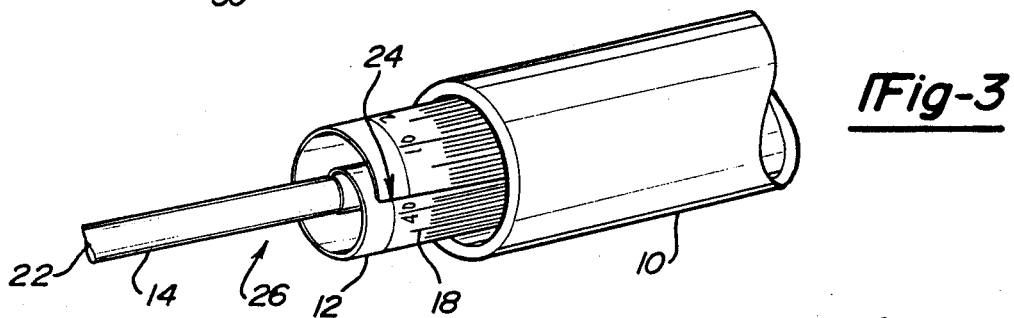
FIG. 3 is a perspective view showing the measuring device being inserted into the rubber hose.
Figure 4:
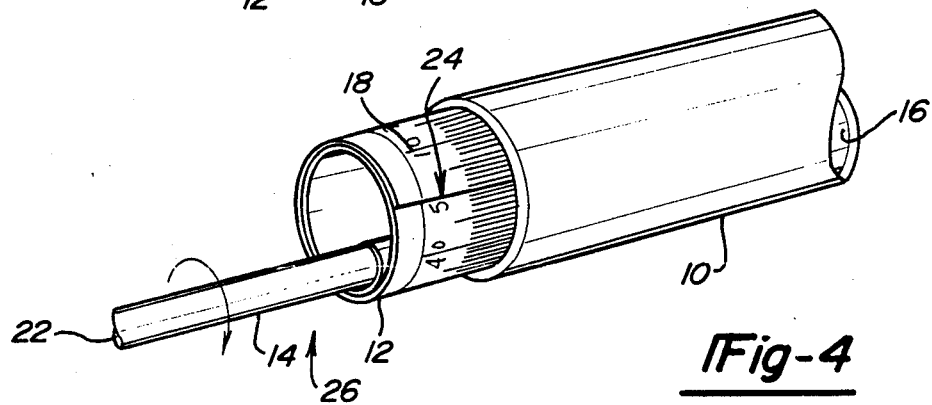
FIG. 4 is a perspective view showing the measuring tape unfurled, fully contacting the inner wall of the rubber hose.

The method for determining the internal diameter of the tube 10 begins with scrolling the tape 12 tightly around the shaft 14 by gently holding the tape 12 in one hand and turning the shaft 14 with the other hand at the uncovered end 22 of the shaft. Once the tape 12 has been scrolled around the shaft 14, the operator inserts the tape 12 into the tube 10 as shown in FIG. 3. Enough of the tape 12 is left outside of the tube 10 so that the numerals on the scale 18 remain visible. When the operator lets go of the tape 12 it will spring open, unfurled around the shaft 14. By turning the shaft 14 the tape 12 will continue to unfurl until it fully and tightly contacts the inner wall 16 of the tube 10. When the operator is satisfied that no air gaps remain between the tape 12 and the inner wall 16 of the tube 10, the operator then lines up the boundary-end-line 24 with the mark or line on the scale 18 which it overlaps as seen in FIG. 4. The line or mark on the scale 18 which the boundary end line 24 overlaps is the measurement.

The scale 18 can be set out in a system of measuring units which will reveal the internal circumference of the tube 10. This measurement would then be converted into the internal diameter of the tube 10 by use of the standard mathematical equation: diameter equals circumference divided by pi. Or the system of measuring units could be set out as a "pi scale" and the internal diameter could be read directly from the tape 18 without any need to convert from the internal circumference. The latter is the preferred method.

Once the measurement is obtained the measuring device 26 is removed from the tube 10. The removal may be easily accomplished by simply turning the shaft 14 in the opposite direction to furl the tape 12 around the shaft 14 and away from the inner wall 16 of the tube 10. The measuring device 26 can then be easily pulled out of the tube 10. The same process can be repeated again and again to accurately and consistently measure the inside diameter of a tube.

It is thought that the measuring device 26 and the method of the present invention and many of its attendant advantages will be understood from the foregoing description and it will be apparent that various changes may be made in the form and construction of the parts thereof without departing from the spirit and scope of the invention or sacrificing all of its material advantages, the form hereinbefore described being merely a preferred or exemplary embodiment thereof.

What is claimed is:

1. A method for determining the internal diameter of a tube, said method comprising the steps of:
    connecting a proximal end of a tape to one end of a shaft, leaving an opposite end of the shaft uncovered so that it may be grasped and turned to scroll the tape around the shaft;
    inserting the tape into the tube;
    turning the shaft thereby unfurling the tape until the tape is fully contacting the inner wall surface of a section of the tube; and reading a scale on the tape to provide a measurement related to the internal diameter of the tube.

2. The method of claim 1 which further comprises:
reading the scale on the tape by noting the location where a boundary end line of the distal end of the tape overlies a set of marks defining a system of measuring units on the tape.

3. The method of claim 2 which further comprises:
converting a measurement of the internal circumference of the tube into the internal diameter of the tube by using a known mathematical equation.

4. The method of claim 2 which further comprises:
using a pi-scale as the system of measuring units so that the internal diameter of the tube can be read directly from the tape without converting the internal circumference.

5. A method for measuring the internal diameter of a small bore rubber hose, said method comprising the steps of:
connecting a proximal end of a tape to one end of a shaft, leaving an opposite end of the shaft uncovered so that it may be grasped and turned to scroll the tape around the shaft;
inserting a portion of the tape into the hose;
turning the shaft thereby unfurling the tape until the portion of the tape inside the hose is fully contacting the inner wall surface of a section of the hose; and
reading a scale on an outside surface of the tape by noting the location where a boundary end line of the distal end of the tape overlies a set of marks defining a pi-scale system of measuring units so that the internal diameter of the hose can be read directly from the tape.

* * * * *